(12) United States Patent
Liau et al.

(10) Patent No.: US 6,574,280 B1
(45) Date of Patent: Jun. 3, 2003

(54) METHOD AND APPARATUS FOR DETECTING AND DETERMINING CHARACTERISTICS OF A DIGITAL CHANNEL IN A DATA COMMUNICATION SYSTEM

(75) Inventors: Thomas Liau, Irvine, CA (US); Jason Brent, Foothill Ranch, CA (US); Zhenyu Zhou, Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/361,872

(22) Filed: Jul. 27, 1999

Related U.S. Application Data

(60) Provisional application No. 60/094,449, filed on Jul. 28, 1998, provisional application No. 60/097,802, filed on Aug. 25, 1998, provisional application No. 60/100,330, filed on Sep. 15, 1998, and provisional application No. 60/100,839, filed on Sep. 18, 1998.

(51) Int. Cl.⁷ .............................. H04B 14/04; H04L 5/16
(52) U.S. Cl. ...................... 375/242; 375/245; 375/222; 379/32.04
(58) Field of Search ................................ 375/245, 242, 375/222, 244; 370/435, 522, 479, 336, 286; 704/212; 455/452; 379/32.04

(56) References Cited

U.S. PATENT DOCUMENTS

| | | | | |
|---|---|---|---|---|
| 4,317,208 A | * | 2/1982 | Araseki et al. | 375/245 |
| 4,860,313 A | * | 8/1989 | Shpiro | 375/245 |
| 4,860,315 A | * | 8/1989 | Hosoda et al. | 375/245 |
| 5,311,578 A | * | 5/1994 | Bremer et al. | 379/93.32 |
| 5,528,679 A | * | 6/1996 | Taarud | 379/32.04 |
| 5,715,277 A | * | 2/1998 | Goodson et al. | 375/222 |
| 5,793,809 A | | 8/1998 | Holmquist | |
| 5,864,545 A | * | 1/1999 | Gonikberg et al. | 370/286 |
| 6,332,009 B2 | * | 12/2001 | Olafsson | 375/357 |
| 6,332,999 B1 | * | 12/2001 | Caretta | 264/501 |
| 6,421,375 B1 | * | 7/2002 | Chu et al. | 370/522 |
| 6,466,562 B1 | * | 10/2002 | Yoshida et al. | 370/336 |

FOREIGN PATENT DOCUMENTS

| | | | |
|---|---|---|---|
| EP | 0533363 A2 | 3/1993 | |
| WO | WO 98/17044 | 4/1998 | |
| WO | WO 98/39866 | 9/1998 | |
| WO | WO 9839866 | * 9/1998 | H04J/3/14 |
| WO | WO 99/12267 | 3/1999 | |
| WO | WO 99/37051 | 7/1999 | |

OTHER PUBLICATIONS

ITU–T V.26bis 2400/1200 Bits Per Second Modem Standaroized for Use in the General Switched Telephone Network.*

ITU–T G.711 Pulse Code Modulation (PCM) of Voice Frequencies.*

* cited by examiner

*Primary Examiner*—Stephen Chin
*Assistant Examiner*—Edith Yeh
(74) *Attorney, Agent, or Firm*—Farjami & Farjami LLP

(57) ABSTRACT

An initialization procedure for a digital modem system treats the presence of ADPCM as if it were a digital impairment such that the modem system can utilize effective compensation techniques to address the ADPCM. The modem system initially determines whether the current communication channel is a fully digital channel. Next, the modem system determines whether the channel includes any ADPCM elements. If ADPCM is detected, then a digital impairment learning routine is performed to obtain the ADPCM compression characteristics and data rate. The digital impairment learning routine may use a single probing sequence to obtain the ADPCM characteristics while identifying any concurrent digital impairments such as RBS, digital pads, and encoding law conversions. Once the digital channel is characterized, the modem system may condition its transmitters and receivers in an appropriate manner to obtain an increased data rate.

40 Claims, 10 Drawing Sheets

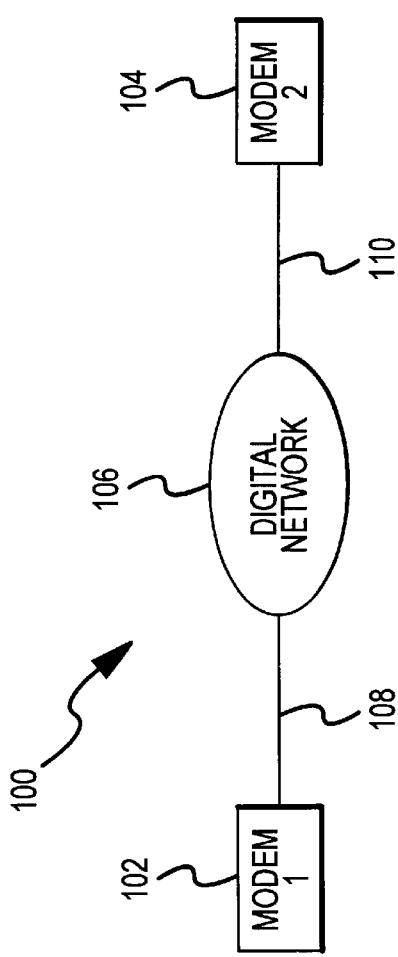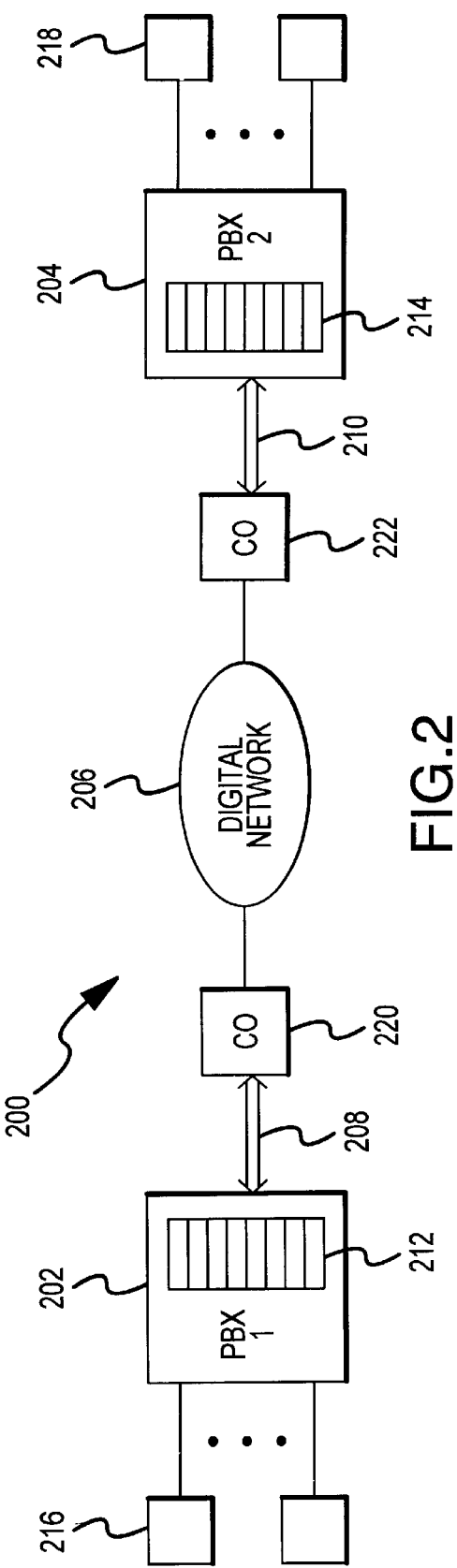
FIG.1
FIG.2

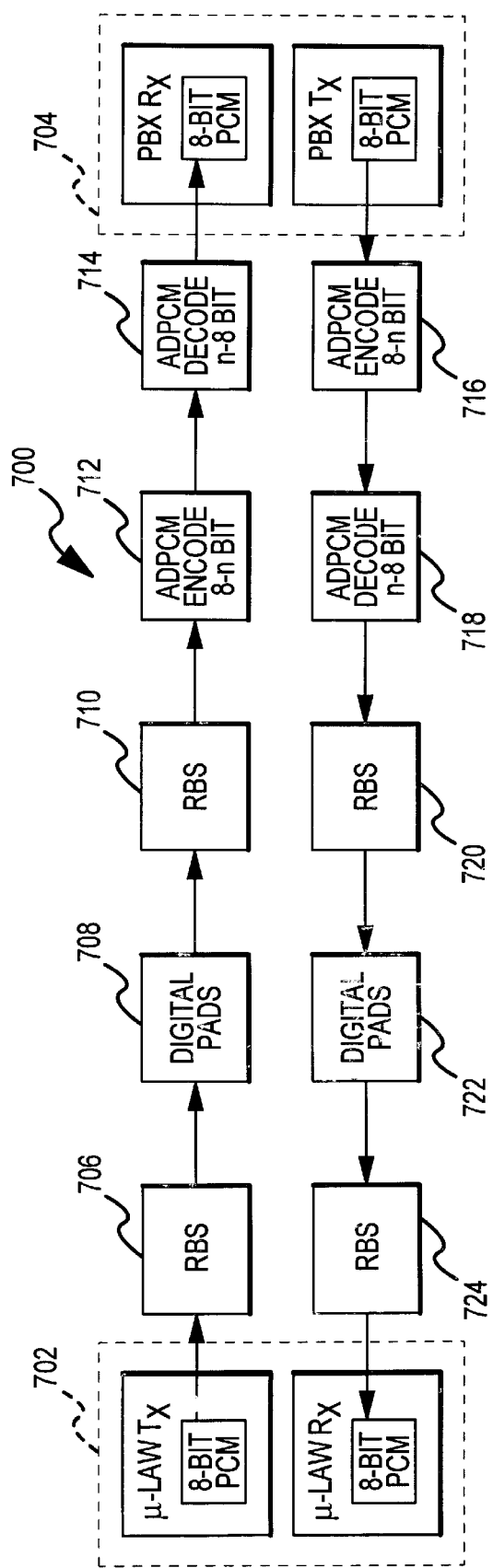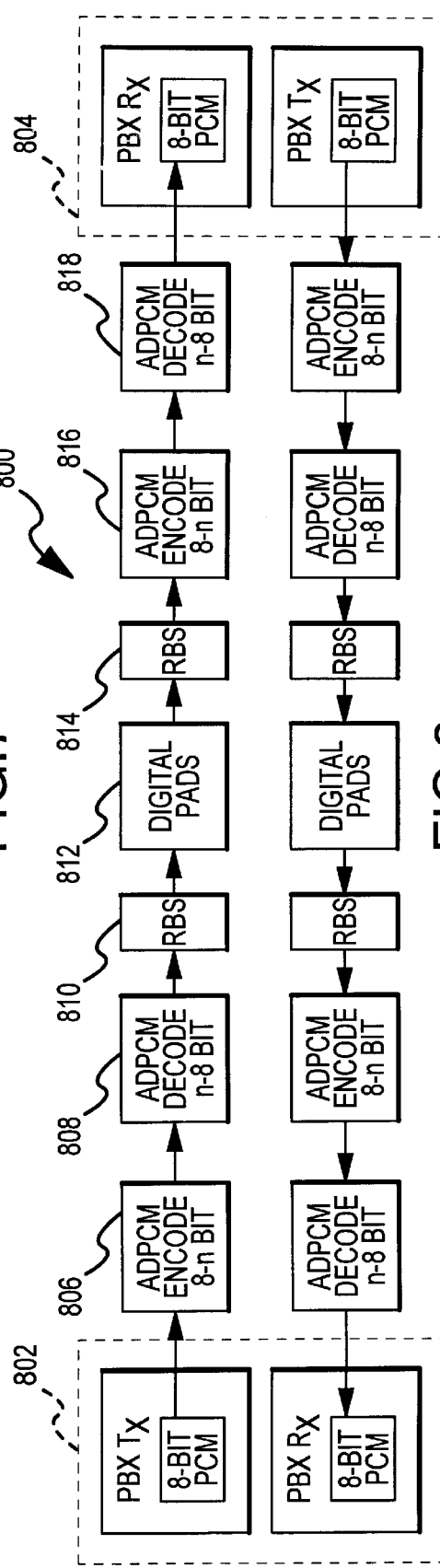

METHOD AND APPARATUS FOR DETECTING AND DETERMINING CHARACTERISTICS OF A DIGITAL CHANNEL IN A DATA COMMUNICATION SYSTEM

CROSS-REFERENCE TO RELATED APPLICATIONS

This application claims the benefit of U.S. Provisional Application No. 60/094,449, filed Jul. 28, 1998, U.S. Provisional Application No. 60/097,802, filed Aug. 25, 1998, U.S. Provisional Application No. 60/100,330, filed Sep. 15, 1998, and U.S. Provisional Application No. 60/100,839, filed Sep. 18, 1998.

BACKGROUND OF THE INVENTION

The present invention relates generally to modem systems that operate with a digital telephone network. More particularly, the present invention relates to signaling techniques for determining the digital characteristics of an end-to-end modem channel.

With the advent of digital modems, e.g., digital pulse code modulation (DPCM) modems compliant with ITU-T Draft Recommendation V.91, end-to-end data transmissions can be performed at theoretical data rates of up to 64 kilobits/second (kbps) where the two modems are digitally connected to a digital telecommunications network. However, because many modem devices are still connected to the telephone network via an analog loop, digital modem devices must remain backward compatible with conventional systems such as V.90 and V.34 modem systems. To enable compatibility with both types of connections (pure digital and an analog/digital combination), an automoding technique is needed to simultaneously determine the connection type while maintaining the integrity of conventional automoding and handshake protocols.

Private branch exchange (PBX) systems and telephone networks outside of the United States may utilize data compression techniques known as adaptive differential pulse code modulation (ADPCM) to reduce the bandwidth of the transmitted signal and to improve the quality of some data transmissions. In contrast to conventional pulse code modulation (PCM) systems that transmit 8-bit codewords at 8 kHz, ADPCM compression techniques enable the data to be transmitted in the form of 4-bit, 3-bit, or 2-bit codewords at 8kHz. Thus, because the codewords are still transmitted at 8 kHz, the effective bit rate is reduced. Conventional modem systems treat ADPCM compression as a form of analog impairment. For example, a conventional V.90 modem system connected over an ADPCM channel will revert to the slower V.34 mode of operation. Unfortunately, the change to V.34 is inherently associated with a slower data rate relative to most V.90 modem connections and relative to an all digital modem connection (as proposed in the draft ITU-T Recommendation V.91).

The initialization and startup routines for a modem system can vary depending upon the characteristics of the current communication channel. For example, the channel may be fully digital, analog, or partially digital. In addition, the channel may be affected by any number of digital (and other) impairments such as robbed bit signaling (RBS), digital pads, encoding law conversions, and any combination thereof. Many data communication systems, such as a V.90 modem system, employ line probing techniques to determine such impairments so that the modem devices can compensate for the impairments. However, these line probing techniques add time to the initialization procedure, which can test the patience of end users who are attempting to establish a fast connection. Furthermore, even though some line probing techniques are unnecessary in the context of certain channel types, conventional modem systems routinely perform line probing procedures in accordance with standard operating protocols.

Accordingly, it would be desirable for a data communication system to implement an efficient and robust inband digital channel determination technique. Although the detection and determination of the digital characteristics of a purely digital end-to-end modem channel may be performed by a devoted signaling or control channel, such a solution may be undesirable because it does not utilize system resources in an optimal manner. In addition, the use of a separate control channel may require a considerable modification to many currently adopted modem standard such as V.90, V.8, and the like.

BRIEF SUMMARY OF THE INVENTION

In accordance with a general embodiment of the present invention, the calling modem transmits digital channel identification (DIDc) sequence to the answer modem near the beginning of the startup routine. The DIDc sequence indicates that the calling modem is digitally connected to the network. The DIDc sequence is also formatted such that the answer modem can determine the characteristics of the communication channel by analyzing the received DIDc sequence. The modem system reacts in an appropriate manner depending upon the detected characteristics of the channel. In this manner, the particular startup procedure can be automatically selected to suit the type of end-to-end channel.

An illustrative embodiment of the present invention is capable of determining whether the current communication channel is an ADPCM channel. If so, the modem system analyzes the specific characteristics of the ADPCM channel and treats the ADPCM compression as if it were a digital impairment. In this manner, the modem system is able to connect at a higher data rate relative to conventional modem systems, e.g., a V.90 system or a system compatible with the Draft Recommendation V.91, that consider ADPCM compression to be an analog impairment associated with an analog channel. The preferred embodiment employs similar techniques to detect and determine other digital impairments such as RBS, digital pads, and encoding law conversions.

The techniques of the present invention may be employed to reduce the startup time associated with conventional modem systems such as V.90 or V.91 systems. Depending upon the detected characteristics of the digital channel, a modem system according to the present invention may be able to eliminate or abbreviate some processes that are mandated by other modem protocols. For example, depending upon the current channel characteristics, the modem system may skip conventional line probing procedures. This feature enables the modem system to reduce the startup latency associated with an end-to-end connection.

The above and other aspects of the present invention may be carried out in one form by a method for initializing a data transmission system having a calling device configured to communicate with an answer device via a digital communication network. The illustrative method involves the establishment of a communication channel between the calling and answering devices, a determination of whether the communication channel is associated with an encoding compression technique, and a determination of the characteristics of the encoding compression technique. The calling device and/or the answering device may then be conditioned to compensate for the characteristics of the encoding compression technique.

BRIEF DESCRIPTION OF THE DRAWINGS

A more complete understanding of the present invention may be derived by referring to the detailed description and claims when considered in connection with the following illustrative Figures, which may not be to scale. In the following Figures, like reference numbers refer to similar elements throughout the Figures.

FIG. 1 is a general block diagram representation of a fully digital end-to-end modem arrangement;

FIG. 2 is a general block diagram representation of a fully digital end-to-end modem system in the context of a public branch exchange (PBX) system;

FIGS. 4–8 are schematic models of illustrative digital communication channels associated with different connection types;

DETAILED DESCRIPTION OF THE PREFERRED EMBODIMENTS

Figure 3:
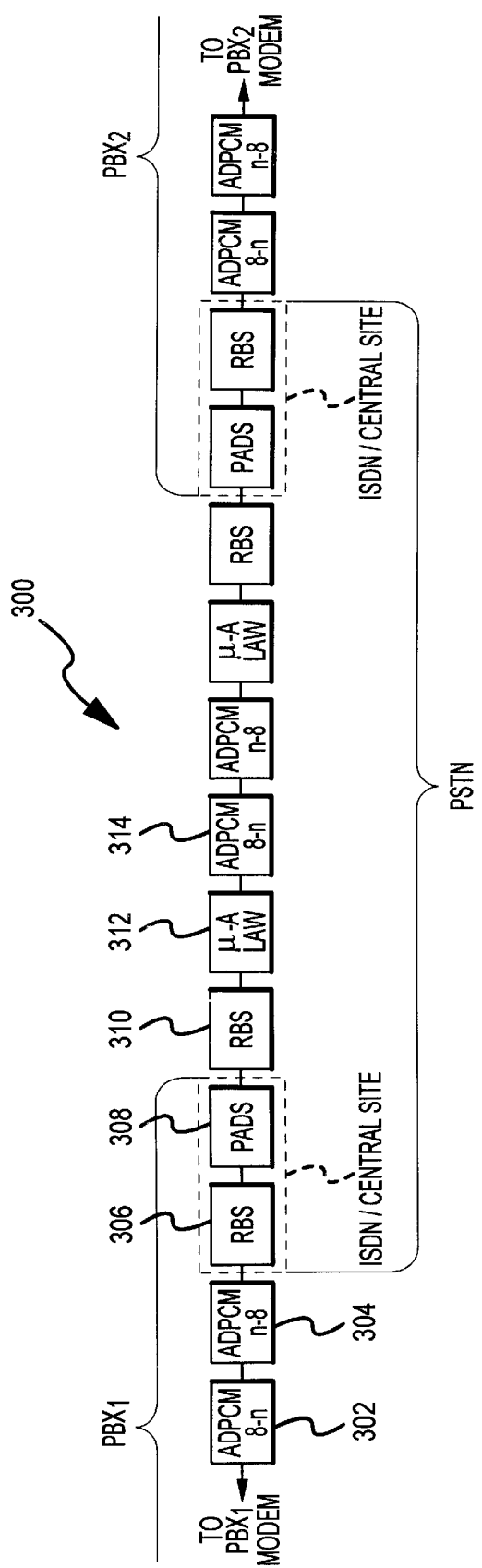
FIG. 3 is a schematic model of a generalized digital communication channel.

The present invention may be described herein in terms of functional block components and various processing steps. It should be appreciated that such functional blocks may be realized by any number of hardware components configured to perform the specified functions. For example, the present invention may employ various integrated circuit components, e.g., memory elements, digital signal processing elements, logic elements, look-up tables, and the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention. Further, it should be noted that the present invention may employ any number of conventional techniques for data transmission, signaling, data processing, network control, and the like. Such general techniques that may be known to those skilled in the art are not described in detail herein.

It should be appreciated that the particular implementations shown and described herein are illustrative of the invention and its best mode and are not intended to otherwise limit the scope of the present invention in any way. Indeed, for the sake of brevity, conventional signal processing, data transmission, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

FIG. 1 depicts a general modem system 100 that may employ the techniques of the present invention. Modem system 100 includes a first modem 102 and a second modem 104, each operatively coupled to a digital communication network 106. Network 106 may be the public switched telephone network (PSTN), and it may include any number of switching components, processing components, and the like. In the context of this description, digital communication network 106 utilizes digital data transmission protocols to transmit digital data between modem 102 and modem 104. In this respect, modem 102 may be operatively coupled to network 106 via a suitable digital connection 108 and modem 104 may be operatively coupled to network 106 via a suitable digital connection 110. In a practical embodiment, modems 102 and 104 may each be associated with a network server and digital connections 108 and 110 may be realized by a T1, ISDN, or fiber optic line.

In the absence of unnecessary digital-to-analog and analog-to-digital converters, a fully digital modem connection (as depicted in FIG. 1) can achieve data rates up to 64 kbps. However, a given modem connection may be established through one or more analog links, e.g., an analog local loop. For example, V.90 modem systems are designed to operate with one digitally connected modem (the server modem) and one modem connected to an analog loop (the client modem). In contrast, V.34 modem systems are designed to operate with both modems connected to the PSTN via analog local loops. The techniques of the present invention enable a modem system to determine whether or not the communication channel is fully digital and to perform a suitable initialization routine depending upon the characteristics of the channel.

FIG. 2 is a block diagram representation of a fully digital end-to-end modem system 200 in the context of a public branch exchange (PBX) system. FIG. 2 illustrates another practical system in which the techniques of the present invention may be applied. A first PBX system 202 is associated with a first location and a second PBX system 204 is associated with a second location. First and second PBX systems 202 and 204 respectively support a plurality of telephony devices 216 and 218. In the context of this description, a telephony device may be a telephone handset, a facsimile machine, a digitally connected modem associated with a personal computer, or the like. In accordance with conventional techniques, first and second PBX systems 202 and 204 may be operatively associated with respective modem banks 212 and 214. Modem bank 212 may be configured to enable any telephony device 216 to establish a communication channel over a digital communication network 206. Although not shown in FIG. 2, PBX systems 202 and 204 may internally implement ADPCM compression techniques for a number of functions, e.g., voice mail storage and retrieval functions.

In a practical embodiment where digital network 206 is the PSTN, a first central office 220 may be digitally connected to first PBX system 202 and a second central office 222 may be digitally connected to second PBX system 204. The respective digital connections 208 and 210 may be realized by digital links having the appropriate capacity to handle the call traffic associated with PBX systems 202 and 204. The digital links between the respective PBX systems and central offices eliminate the need for analog-to-digital and digital-to-analog conversions and enable modem system 200 to function as a fully digital system.

FIG. 1 and FIG. 2 depict only two of many different possible modem architectures. For example, a modem system may establish a communication channel between a digitally connected PBX system and a digitally connected server modem, between a digitally connected server modem and a server modem connected via an analog loop, or between an analog connected PBX system and an analog connected client modem. The concepts described herein and the techniques of the present invention may be applied in the context of any practical modem system. Indeed, the present invention provides a flexible initialization procedure that allows the modem system to recognize the current communication channel characteristics and to react in an appropriate manner.

In conventional V.90 or fully digital modem systems, if the communication channel includes ADPCM, hen the system falls back to a V.34 analog mode or other modes having lower data rates. Although ADPCM can be considered to be a digital impairment, V.34 systems assume it to be an analog noise source. Consequently, the final data rates achieved by conventional modems connected over ADPCM channels are disappointing at best. For example, in a typical 32 kbps ADPCM channel, modems usually connect at data rates between 14.4 kbps and 16.8 kbps, which is less than half of the optimal rate. Accordingly, the conventional treatment of ADPCM channels can be inadequate in view of the increasing popularity of hybrid digital and fully digital modem systems and the associated consumer expectation of high data rates.

In the preferred embodiment of the present invention, the detection of an analog communication channel (or a partially analog communication channel) prompts the modem system to escape into a conventional analog handshake/startup routine. For example, in response to the determination that a fully digital communication channel has not been established between the modem devices, the modem system may transition into the conventional initialization mode associated with V.34 or V.90 modem systems (the concepts described herein may be equivalently applied to portions of the downstream V.90 channel). The V.34 and V.90 initialization routines are generally well known to those skilled in the art and, therefore, will not be described in detail herein. If, however, a fully digital communication channel is detected, then the modem system preferably proceeds to analyze the digital characteristics of the channel.

In the context of this description, a number of different communication channels may be considered to be a "fully digital" channel, e.g., a pure digital channel or a digital channel having digital impairments. Generally, the different types of digital channels (typically having different digital characteristics) may be grouped into three main categories: (1) PSTN switched calls between any combination of an ISDN channel and a central site modem; (2) PSTN switched calls between an ISDN channel or a central site modem and a digitally connected modem associated with a PBX system; and (3) PSTN switched calls between two digitally connected modems associated with two PBX systems. Of course, these general architectures and the corresponding illustrative communication devices/protocols are not intended to limit the scope of the present invention, which may encompass other communication devices and protocols (known or to be developed in the future).

FIG. 3 is a schematic model of a digital communication channel 300 that illustrates the different types of digital impairments that may occur in the context of a fully digital modem connection (the model may also apply in an equivalent manner to one direction in a hybrid digital connection). Although many of the impairments do not occur concurrently, channel 300 includes the impairments typically associated with the different digital channel categories described above. In this respect, FIG. 3 is a composite illustration that includes impairments associated with two PBX systems, impairments associated with the PSTN equipment, and impairments associated with the ISDN or central site modem equipment (encircled by the dashed lines in FIG. 3). As shown in FIG. 3, depending upon the particular connection, either the user equipment (e.g., the PBX system, the ISDN equipment, or the central site modems) or the PSTN equipment may be the source of the digital pads and RBS. Of course, a practical embodiment may assume that the various impairments may occur in any portion of the channel; the techniques described herein may be suitably utilized to handle such impairments wherever they may occur.

Briefly, digital communication channel 300 may include a first ADPCM element 302 that performs 8-bit to n-bit encoding (downstream) and n-bit to 8-bit decoding (upstream). Channel 300 may also include a second ADPCM element 304 performs n-bit to 8-bit encoding and 8-bit to n-bit decoding. As depicted in the example of FIG. 3, ADPCM elements 301 and 304 are implemented in the first PBX system. A first RBS component 306 and a first digital pad component 308 may be implemented in the first PBX system, in the PSTN equipment, in the ISDN equipment, or in the central site modem. Channel 300 may also include a second RBS component 310 associated with the PSTN equipment. For some connections, e.g., intercontinental connections, channel 300 may include an encoding conversion element. In FIG. 3, the encoding conversion element is depicted as a mu-law to A-law converter 312. In addition, channel 300 may include a third ADPCM element 314 that performs 8-bit to n-bit encoding and n-bit to 8-bit decoding. The various ADPCM elements described herein may employ any known ADPCM compression protocol. e.g., 40 kbps, 32 kbps, 24 kbps, G.726, or the like.

Digital communication channel 300 may also include similar digital impairment sources associated with the complete end-to-end channel (as depicted following ADPCM element 314 in FIG. 3). Specific digital channel models for common systems are described in more detail below. Those skilled in the art are familiar with these digital impairment sources and the manner in which the data communication and network equipment introduces such digital impairments. Furthermore, those skilled in the art are aware of the manner in which such digital impairments affect the codewords transmitted over channel 300. Accordingly, these fundamental features of the digital impairments are not described at length herein.

Figure 4:
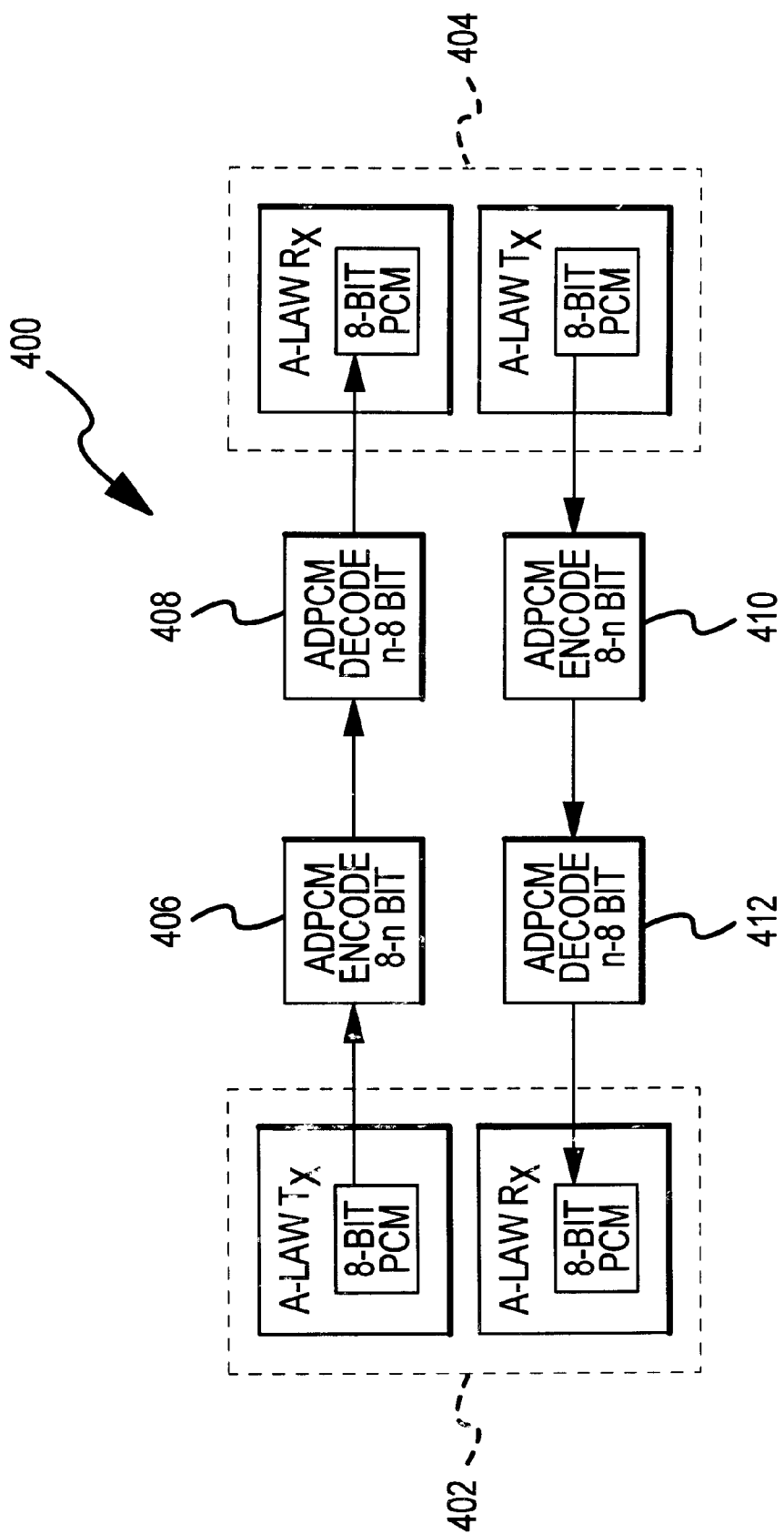
Figure 5:
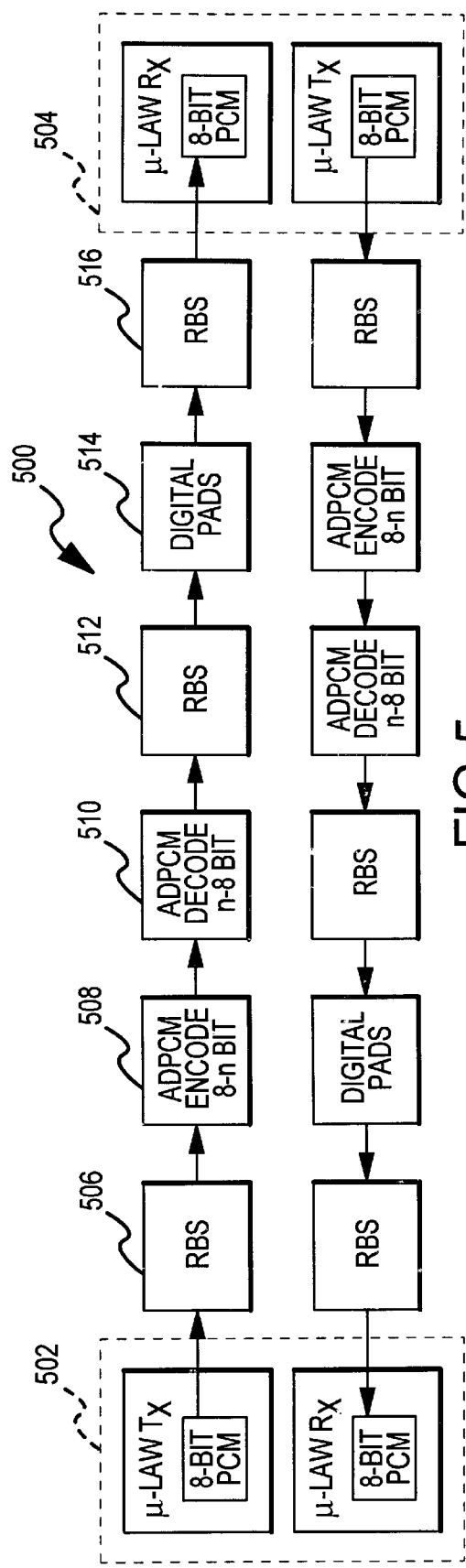
Figure 6:
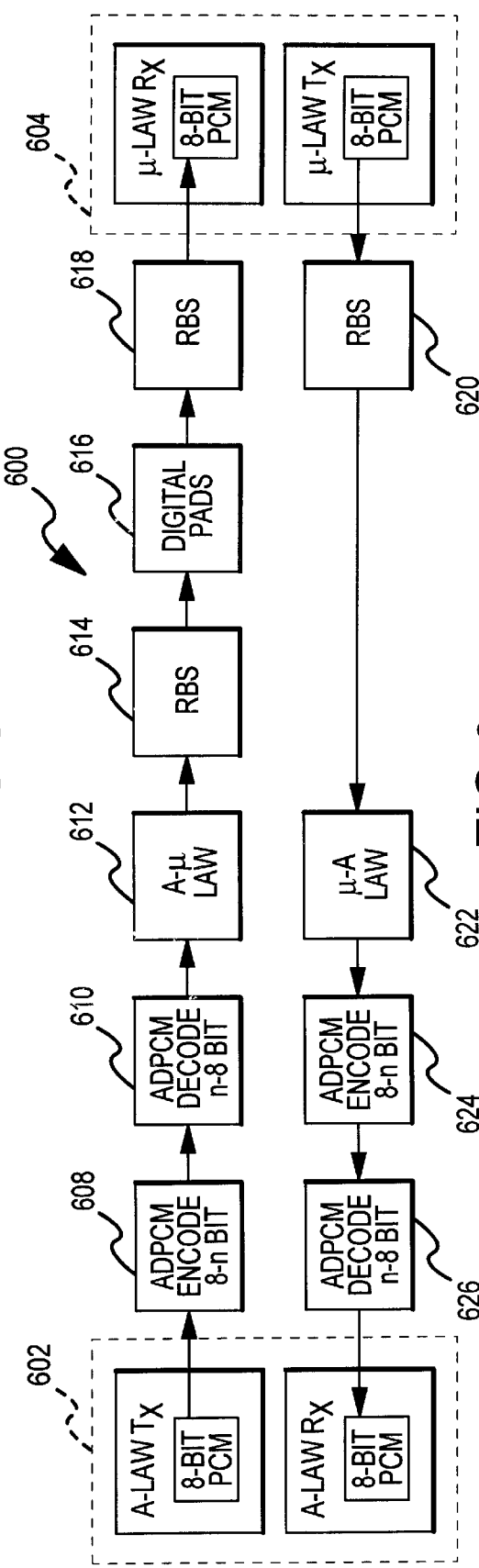

FIGS. 4–6 are schematic digital channel models of different connection types associated with a PSTN switched call among ISDN voice or "B" channels and central site digital modems (i.e., calls between two ISDN channels, calls between two central site digital modems, or calls between an ISDN channel and a central site digital modem). For connections over the PSTN, ADPCM is most likely to be encountered when calls are inter-continental. For example, such a connection may be established if an ISDN channel in Europe calls a central site modem in Asia or in North America, and vice versa. Depending upon the origin and destination of the particular call, either PCM mu-law or PCM A-law characteristic codes are used. Furthermore, different calling regions usually implement different sets of concurrent digital impairments together with the ADPCM. For example, in the cases where an A-law digitally connected modem is connected to another A-law digitally connected modem over the PSTN, it is very likely that no other concurrent digital impairments are present other than the ADPCM. In contrast, channels associated with mu-law regions are likely to include RBS along with the ADPCM.

FIG. 4 depicts a schematic channel model 400 of a PSTN switched call among A-law ISDN channels and A-law central site digital modems. Telephone networks implementing A-law formats, e.g., European countries, usually do not implement RBS or digital pads. Consequently, as mentioned above, two A-law digital modem devices connected over the PSTN are unlikely to be associated with any digital impairments other than ADPCM. As such, the general channel model 300 may be simplified to channel model 400. As shown, a first modem device 402 and a second modem device 404 each include an A-law transmitter and an A-law receiver. The transmitters and receivers are compatible with the 8-bit A-law encoding scheme. The downstream channel from modem deice 402 to modem device 404 contains an 8-bit to n-bit ADPCM element 406 followed by an n-bit to 8-bit ADPCM element 408. Similarly, the upstream channel contains an 8-bit to n-bit ADPCM element 410 followed by an n-bit to 8-bit ADPCM element 412.

FIG. 5 depicts a schematic channel model 500 of a PSTN switched call among mu-law ISDN channels and mu-law central site digital modems. Unlike the A-law channel of FIG. 4, connections between two digital mu-law modem devices are likely to encounter concurrent digital impairments in addition to the ADPCM. The most common type of concurrent impairment is RBS introduced by the PSTN. Although uncommon, digital pads can also exist in a mu-law to mu-law communication channel. However, because digital pads are usually implemented in the last switch in a receive path, channel model 500 assumes that the ADPCM conversion occurs before the digital pads. In addition, because RBS can be introduced by different network equipment, it is possible for RBS to exist at three different physical locations in a fully digital channel.

As shown, a first modem device 502 and a second modem device 504 each include a mu-law transmitter and a mu-law receiver. The transmitters and receivers are compatible with the 8-bit mu-law encoding scheme. The downstream channel from modem device 502 to modem device 504 may contain the following digital impairments, in order of "appearance" in the channel: a first RBS component 506, an 8-bit to n-bit ADPCM element 508, an n-bit to 8-bit ADPCM element 510, a second RBS component 512, a digital pad element 514, and a third RBS component 516. Notably, the possible RBS locations are: (1) prior to the ADPCM conversion; (2) immediately following the ADPCM conversion; and (3) after the digital pads. In the context of FIG. 5, first and second RBS components 506 and 512 are caused by network equipment associated with the call switching, while third RBS component 516 is often caused by digital loop carriers associated with the provision of digital link services from a local central office to a cluster of subscribers. The upstream channel may include digital impairments that are equivalent to those described above for the downstream channel.

FIG. 6 depicts a schematic channel model 600 of a PSTN switched call among ISDN channels and central site digital modems that employ different PCM characteristic codes, e.g., mu-law and A-law. For purposes of channel model 600, it is assumed that the mu-law service regions are responsible for maintaining the proper PCM format; the PSTN in the mu-law country typically converts transmitted mu-law codewords into A-law codewords and converts the A-law codewords received from the A-law country into mu-law codewords. Consequently, channel model 600 does not have equivalent characteristics in both directions.

As illustrated in FIG. 6, a first modem device 602 includes an A-law transmitter and an A-law receiver, while a second modem device 604 includes a mu-law transmitter and a mu-law receiver. The transmitter and receiver for modem device 602 are compatible with the 8-bit A-law encoding scheme and the transmitter and receiver for modem device 604 are compatible with the 8-bit mu-law encoding scheme. The channel direction from A-law modem device 602 to mu-law modem device 604 may contain the following digital impairments, in order of "appearance" in the channel: an 8-bit to n-bit ADPCM element 608, an n-bit to 8-bit ADPCM element 610, an A-law to mu-law conversion element 612, a first RBS component 614, a digital pad element 616, and a second RBS component 618. As described above, first RBS component 614 is caused by the network switching equipment and second RBS component 618 may be caused by a digital loop carrier. Notably, channel model 600 assumes that ADPCM elements 608 and 610 occur before conversion element 612. In contrast, the channel direction from mu-law modem device 604 to A-law modem device 602 may contain the following digital impairments, in order of "appearance" in the channel: an RBS component 620, a mu-law to A-law conversion element 622, an 8-bit to n-bit ADPCM element 624, and an n-bit to 8-bit ADPCM element 626. In this direction, channel model 600 assumes that the ADPCM elements 624 and 626 occur after conversion element 622. Furthermore, because A-law systems do not traditionally employ RBS, no RBS components are present after the conversion from mu-law to A-law.

The second general category of connection types are PSTN switched calls between an ISDN channel or a central site modem (CSM) and a digitally connected modem (DCM) associated with a PBX system. FIG. 7 is a schematic channel model 700 of one such connection. As mentioned above, many PBX systems implement ADPCM to conserve voice mail storage space. Accordingly, a modem that is digitally connected to a PBX system may encounter ADPCM when placing fully digital calls that are not international. A common practical example of this type of connection occurs when the internet is accessed from a computer in a hotel room (most hotels utilize some form of PBX system). In this situation, the first modem is a digitally connected modem (in the user's personal computer) associated with a PBX system (the hotel telecommunication system), while the second modem is a central site modem hosted by an internet service provider.

As described briefly above, because most typical A-law countries have no additional digital impairments other than ADPCM, the A-law channel model for an ISDN channel or a central site modem connected to a PBX via a digitally connected modem is equivalent to channel model 400 (see FIG. 4). Of course, one modem device shown in FIG. 4 would be a central site modem while the other modem device would be a digitally connected modem connected to a PBX system; in turn, the PBX system would be digitally connected to the PSTN (see FIG. 2). In contrast, channel model 700 may apply to the same connection in a mu-law context because mu-law connections may be associated with RBS and/or digital pads.

Referring to FIG. 7, a first modem device 702 (e.g., a central site modem) includes a mu-law transmitter and a mu-law receiver, while a second modem device 704 (e.g., a PBX modem) includes a mu-law transmitter and a mu-law receiver. For purposes of this example, second modem device 704 may be implemented in a computing device and it may utilize a suitable PBX interface for compatibility with the associated PBX system. The transmitter and receiver for modem device 702 and the transmitter and receiver for modem device 704 are all compatible with the 8-bit mu-law encoding scheme. The channel direction from modem device 702 to modem device 704 may contain the following digital impairments, in order of "appearance" in the channel: a first RBS component 706, a digital pad element 708, a second RBS component 710, an 8-bit to n-bit ADPCM element 712, and an n-bit to 8-bit ADPCM element 714. Assuming that second modem device 704 implements ADPCM, it follows that ADPCM elements 712 and 714 occur after any concurrent digital impairments (e.g., RBS and/or digital pads) in this direction. In the context of FIG. 7, ADPCM elements 712, 714, 716, and 718 are implemented in the PBX system.

The model for the channel direction from modem device 704 to modem device 702 is essentially a reversal of the model for the opposite channel direction. In this respect, the channel direction from second modem device 704 to first modem device 702 may include the following digital impairments, in order of "appearance" in the channel: an 8-bit to n-bit ADPCM element 716, an n-bit to 8-bit ADPCM element 718, a first RBS component 720, a digital pad element 722, and a second RBS component 724. In this direction, channel model 700 assumes that the ADPCM elements 716 and 718 occur before the concurrent digital impairments.

A third category of connection types are associated with PSTN switched calls between two digitally connected modems associated with two PBX systems. FIG. 8 is a schematic channel model 800 for an illustrative connection of this type. Practical examples of this connection type are inter-office facsimile transmissions and data networking. FIG. 8 depicts a mu-law environment, i.e., both PBX systems are located in a mu-law region. As described above, a mu-law communication channel may contain RBS and digital pads as digital impairments. Accordingly, channel model 800 includes two sets of ADPCM elements separated by possible RBS and digital pad combinations.

Referring to FIG. 8, a first modem device 802 is associated with a first PBX system and a second modem device 804 is associated with a second PBX system. In a mu-law embodiment, the transmitters and receivers for modem devices 802 and 804 are all compatible with the 8-bit mu-law encoding scheme. As shown, the channel direction from modem device 802 to modem device 804 may contain the following digital impairments, in order of "appearance" in the channel: a first 8-bit to n-bit ADPCM element 806, a first n-bit to 8-bit ADPCM element 808, a first RBS component 810, a digital pad element 812, a second RBS component 814, a second 8-bit to n-bit ADPCM element 816, and a second n-bit to 8-bit ADPCM element 818. The opposite channel direction may include the same digital impairments in the same order.

In contrast to the mu-law embodiment, an A-law embodiment of the PBX-to-PBX connection type will usually have no concurrent digital impairments. Accordingly, the channel model for an A-law embodiment may be identical to channel model 800 with the RBS components and digital pad elements removed. In other words, the channel model for an A-law version is assumed to contain "back-to-back" ADPCM conversions with no intervening digital impairments.

The various channel models described above may be utilized in the context of the present invention to enable a modem system to suitably determine the digital characteristics of the current connection. With an accurate assessment of the nature of the digital impairments contained in the communication channel, the modem system may then make the appropriate adjustments to compensate for such digital impairments. In a practical system, such compensation may result in a more optimized data rate for the given communication session.

Figure 9:
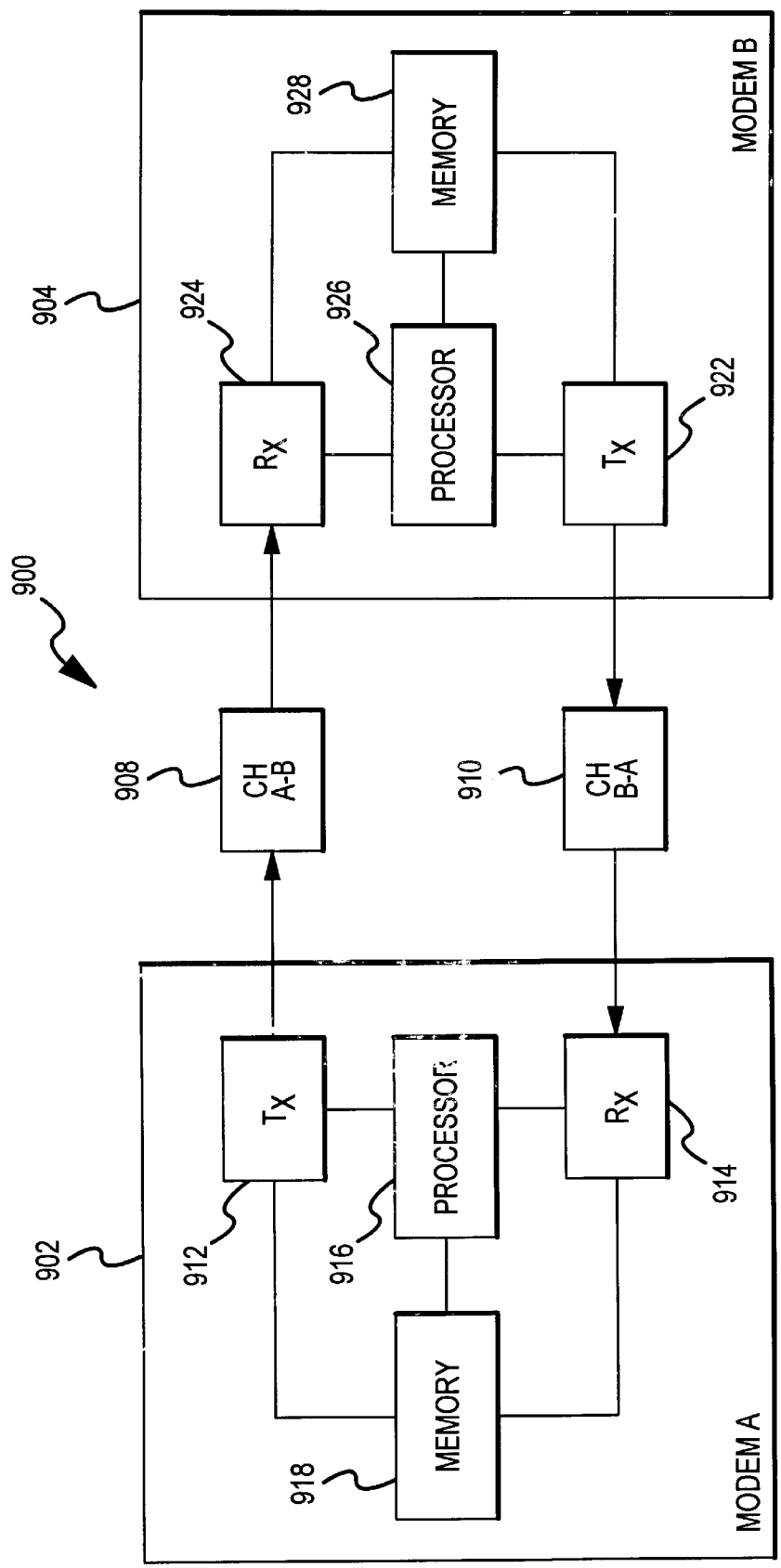
FIG. 9 is a block diagram depicting an illustrative modem system that may be utilized in the context of the present invention.

FIG. 9 is a block diagram depicting a general modem system 900 that may be utilized in the context of the present invention. Modem system 900 is preferably configured to carry out a number of conventional data communication processes along with the various processes described herein. By way of example, modem system 900 is described herein in the context of a fully digital system, i.e., a system where both modem devices are digitally connected to a digital telephone network. However, it should be appreciated that the particular implementation shown in FIG. 9 and described herein is not intended to limit the scope of the present invention in any way.

Generally, modem system 900 includes a first modem, e.g., modem 902, and a second modem, e.g., modem 904. In the context of this description, modem 902 is considered to be a calling modem and modem 904 is considered to be an answering modem. It should be appreciated that modems 902 and 904 may be similarly configured such that both can function in either a transmit or receive mode. Modems 902 and 904 are generally configured in accordance with known principles to communicate over a telecommunication network, such as the PSTN, via at least one communication channel (e.g., channels 908 and 910). For the sake of clarity, FIG. 9 does not show the various encoder, decoder, and other detailed functional elements that would typically be present in a practical modem system.

Modem 902 generally includes a transmitter 912, a receiver 914, a processor element 916, and a memory element 918. In addition to the specific operations described herein, processor element 916 is suitably configured to carry out various tasks associated with the operation of modem system 900. Indeed, modem system 900 may incorporate any number of processors, and/or control elements as necessary to support its functionality. Such processor and control elements may suitably interact with other functional components of modems 902 and 904 to thereby access and manipulate data or monitor and regulate the operation of modem system 900.

As depicted in FIG. 9, processor element 912 may be operationally associated with transmitter 912, receiver 914, and memory element 918. Processor element 912 may be realized by a suitable digital signal processing component that is configured to operate in conjunction with transmitter 912, receiver 914, memory element 918, and/or suitable software instructions to carry out the various processing tasks described herein.

Transmitter 912 is configured to transmit encoded symbols in accordance with conventional data transmission techniques. Such symbols may represent data, training sequences, synchronization signals, control signals, information exchange sequences, and any suitable communication signal utilized by modem system 900. Modem 900 also includes a receiver 914, which may be configured in accordance with any number of known modem technologies. Receiver 914 is configured to receive communication signals from modem 904; such signals may include encoded information bits, control signals, information exchange sequences, training sequences, and the like. Modem 902 is preferably configured to generate, transmit, receive, and process different data and signals associated with the operation of modem system 900. Such data, signals, and sequences may be suitably stored, formatted, and produced by any number of microprocessor-controlled components. Illustrative data and sequences, and the handling of such data and sequences by modem system 900, are described in detail below.

Modem 902 also includes a suitable amount of memory 918 necessary to support its operation. Memory element 918 may be a random access memory, a read only memory, or a combination thereof. Memory element 918 may be configured to store information utilized by modem system 900 in connection with one or more processes related to the present invention, as described in more detail below. Modem system 900 may employ any number of conventional memory elements; the fundamental operation of such memory elements, which are generally well known in the art, will not be described in detail herein.

Modem 904 may be configured in a similar manner as modem 902. Accordingly, the above description of the components employed by modem 902 may be equivalently applied in the context of a transmitter 922, a receiver 924, a processor element 926, and a memory element 928. The various functional elements associated with modem system 900 are preferably configured to operate in accordance with the present invention.

Figure 10:
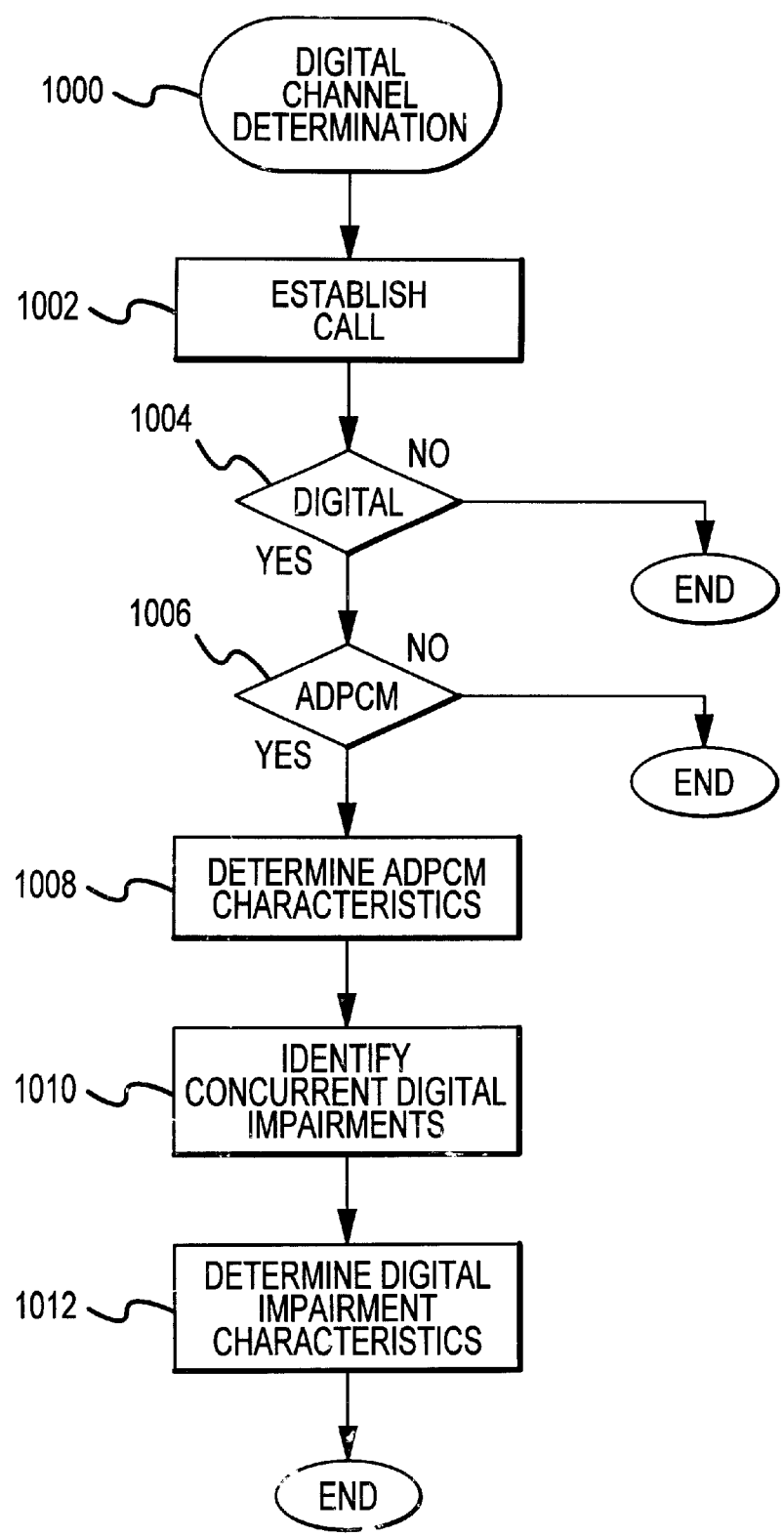
FIG. 10 is a flow diagram of a digital channel determination process that may be performed by a modem system configured in accordance with the present invention.

Referring now to FIG. 10, a technique in accordance with the present invention will be described in the context of one practical embodiment. FIG. 10 is a flow diagram of a digital channel determination process 1000 that may be performed by a modem system configured in accordance with the present invention, e.g., modem system 900. In a practical system, process 1000, or portions thereof, may be cooperatively performed by one modem device, both modem devices, host software, or any functional component of the modem system. In addition, process 1000 may be realized in the context of an overall initialization procedure that may follow any number of conventional telecommunication protocols.

Digital channel determination process 1000 is performed in the context of a system having a calling device that communicates with an answer device via a digital telecommunication network, e.g., a digital PSTN. Process 1000 begins with a task 1002, which relates to the establishment of a call between the two end-to-end modem devices. During task 1002, the calling device (or host software associated with the calling device) may dial a telephone number associated with the answer device. Assuming that the answer device is capable of making the connection, it will respond to the incoming call and generate a suitable answer tone in a conventional manner. When both modem devices are communicating with each other, a communication channel is established over the digital network.

Following task 1002, a query task 1004 may be performed to determine or ascertain whether the current communication channel is a fully digital channel. If query task 1004 determines that the channel is not fully digital, then process 1000 ends. At this point, process 1000 may escape to conventional analog (or digital/analog hybrid) initialization mode. If the present channel is fully digital, then a query task 1006 may be performed to further analyze the channel to identify whether the channel is associated with an encoding compression technique. In a practical illustrative embodiment, query task 1006 may determine whether the communication channel contains any ADPCM components. As mentioned above, the present invention may be applied in the context of the downstream channel, the upstream channel, or both channels. Thus, for purposes of this description, a "communication channel" applies to a half-duplex or a full-duplex channel.

If query task 1006 determines that signals are not affected by an encoding compression technique, then process 1000 may exit into a conventional "all digital" PCM mode such that the fully digital "memoryless" nature of the connection can be immediately exploited. However, if query task 1006 detects that encoding compression (e.g., DPCM or ADPCM according to the G.726 protocol, 40 kbps, 32 kbps, or other algorithms) is employed in the channel, then a task 1008 may be performed to determine the characteristics of the encoding compression technique. In one practical embodiment, task 1008 suitably determines the type of ADPCM algorithm employed by the ADPCM technique. In addition, task 1008 may determine the compression data rate employed by the ADPCM technique.

In addition to task 1008, process 1000 may perform a task 1010 to identify or detect whether the communication channel is associated with concurrent digital impairments, e.g., RBS, digital pads, and/or encoding law conversions. A task 1012 may be performed concurrently with or following task 1010. During task 1012, the modem system analyzes and determines the characteristics of any concurrent digital impairments detected during task 1010. Of course, task 1012 is unnecessary if task 1010 discovers no concurrent digital impairments.

Following task 1012, digital channel determination process 1000 ends. At this point, the digital nature and characteristics of the current communication channel are known to the modem system. Process 1000 may continue with (or prompt) an initialization procedure that leverages the information obtained during process 900 during the remainder of the system startup. The details of the various tasks performed during process 900 and the manner in which the system utilizes the channel characteristics are described in more detail below.

Figure 11:
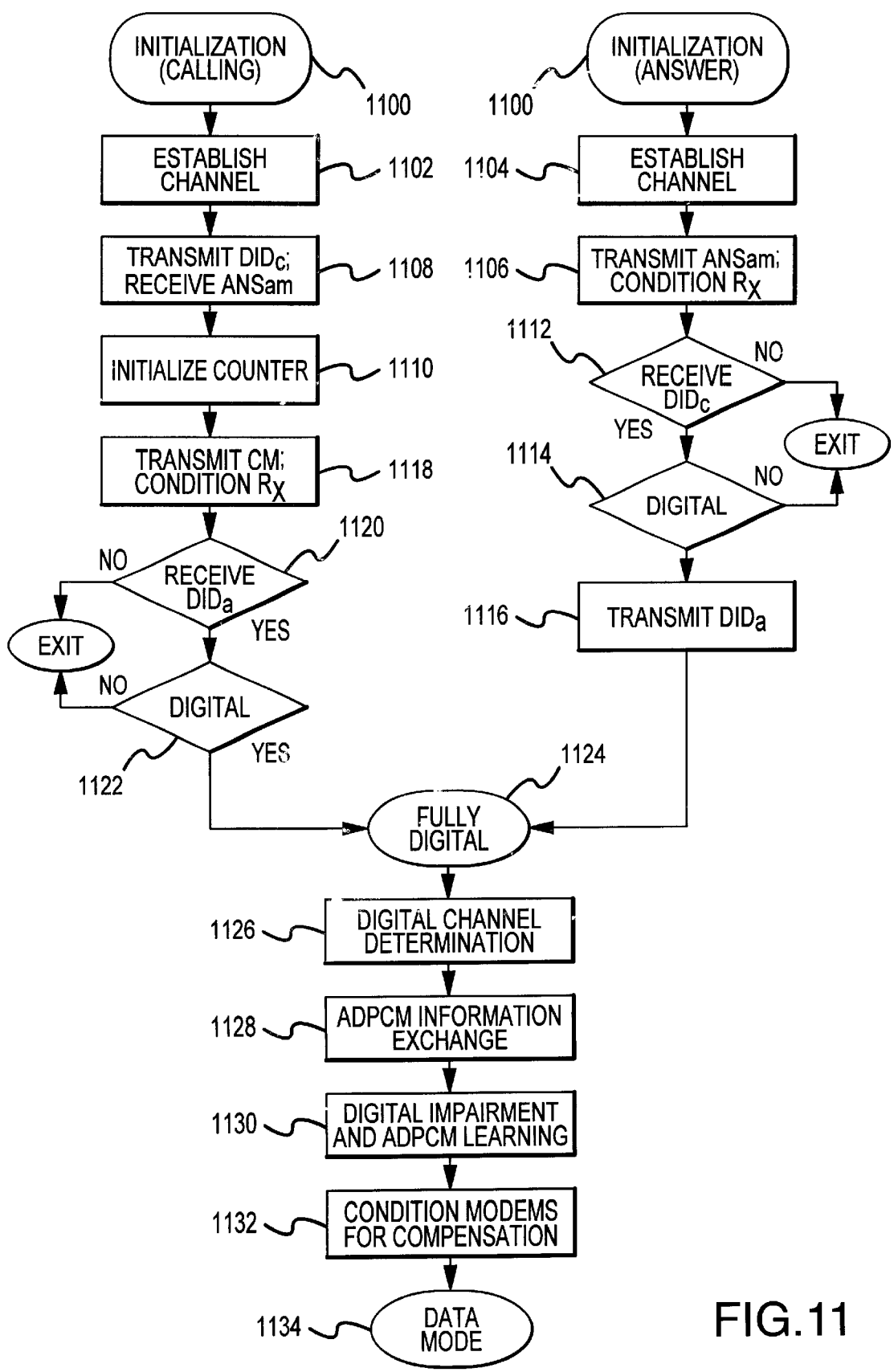
FIG. 11 is a flow diagram of an initialization process that may be performed by a modem system configured in accordance with the present invention.
Figure 12:
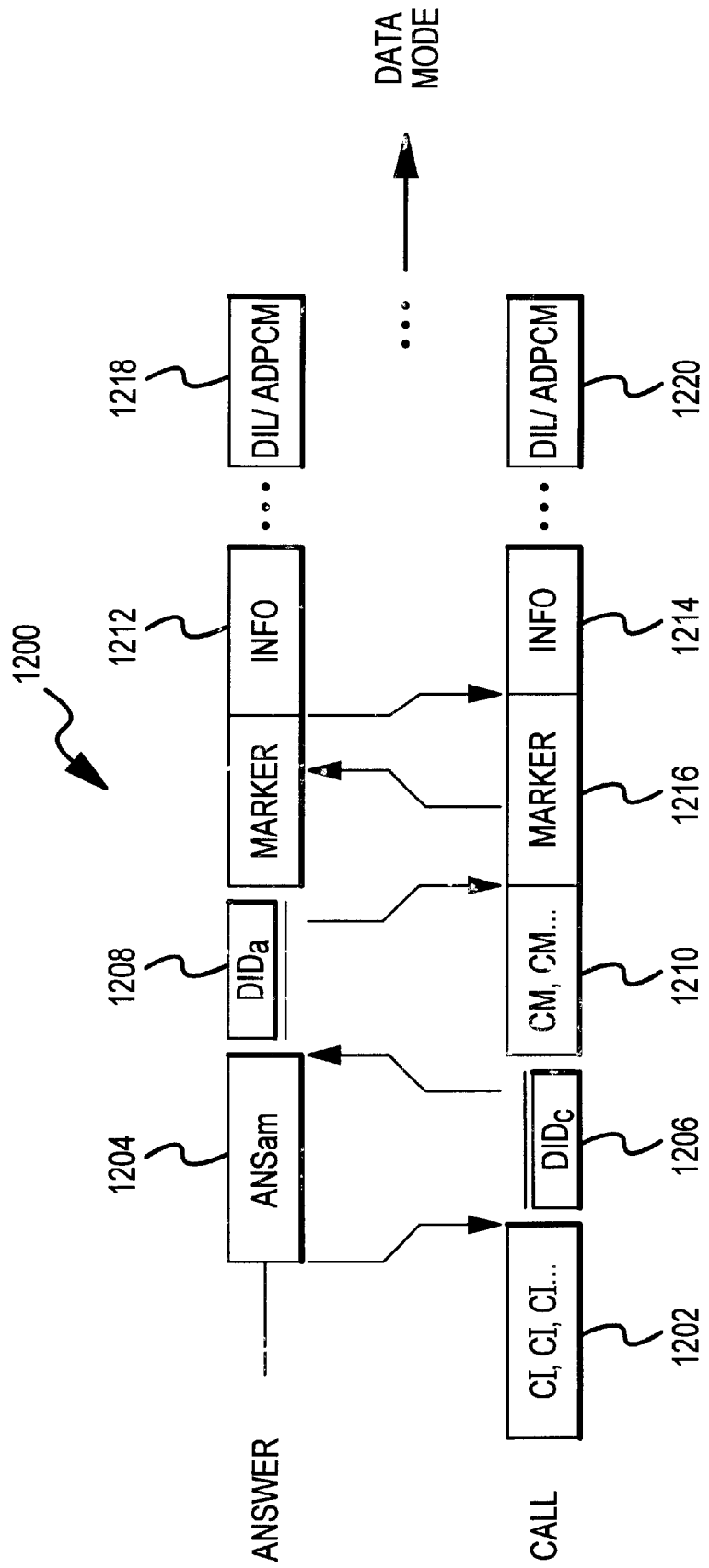
FIG. 12 is a timing diagram depicting sequences and signals that may be transmitted during the modem initialization process.

FIG. 11 is a flow diagram of an initialization process 1100 that may be performed by a modem system configured in accordance with the present invention, and FIG. 12 is a timing diagram 1200 depicting sequences and signals that may be transmitted during modem initialization process 1100. For the sake of clarity, FIG. 11 is partially divided according to certain process tasks that are associated with the calling device and the answer device. Those skilled in the art will recognize that some of the process tasks described in connection with FIG. 11 may be concurrently performed by calling device 902 and answer device 904. The latter portion of process 1100 as depicted in FIG. 11 includes process tasks that may be performed by both devices. Similarly, timing diagram 1200 is divided into segments associated with the calling device and segments associated with the answer device. For illustrative purposes, the following description of process 1100 may refer to modem system 900.

Initialization process 1100 begins with tasks 1102 and 1104, during which a communication channel is established between the calling device 902 and the answer device 904. Tasks 1102 and 1104 may be associated with task 1002 described above (see FIG. 10). When the call is connected and the communication channel is established, the calling device 902 may transmit a call identifier signal 1202 (represented by CI in FIG. 12). The CI signal 1202 may be configured and transmitted in accordance with the ITU-T Recommendation V.8 (International Telecommunication Union, February 1998). The entire content of the V.8 Recommendation is incorporated herein by reference. In response to CI signal 1202, or after a certain time has lapsed following the establishment of the call, a task 1106 may be performed by the answer device 904.

Task 1106 causes transmitter 922 to transmit a suitably formatted analog answer tone. In a practical embodiment, the analog answer tone may be formatted in accordance with the ANSam tone set forth in the V.8 Recommendation. Referring to FIG. 12, the analog answer tone is represented by the ANSam signal 1204. Generally, the ANSam tone 1204 is an analog signal that informs the calling device 902 that the answer device 904 has answered the current call. In addition to the, generation and transmission of the ANSam tone 1204, task 1106 may cause answer device 904 to condition receiver 924 in an appropriate manner to receive a digital channel identification sequence from calling device 902. This digital channel identification sequence is represented by the DIDc sequence 1206 in FIG. 12.

After the establishment of the communication channel, calling device 902 transmits DIDc sequence 1206 to answer device 904 (task 1108). In the preferred embodiment, calling device 902 transmits DIDc sequence 1206 "automatically" if it is digitally connected to the network. During task 1108, calling device 902 also receives ANSam tone 1204 from answer device 904. In the preferred embodiment, calling device 902 transmits DIDc sequence 1206 while answer device 904 is transmitting ANSam tone 1204. Notably, DIDc sequence is configured such that it does not interfere with conventional initialization routines, e.g., routines that employ V.8 or V.8bis. Indeed, DIDc sequence 1206 is preferably formatted such that conventional modem systems will perceive DIDc sequence 1206 as analog noise. For example, in one practical embodiment, DIDc sequence 1206 may be suitably configured such that its equivalent transmit power level is less than −48 dBm (the requirement for the transmission of "silence" in many data communication systems).

DIDc sequence 1206 is preferably formatted as a sequence of PCM codewords that enable answer device 904 to determine characteristics of the current communication channel. In the preferred embodiment, DIDc sequence 1206 is capable of revealing whether a fully digital connection has been established and, if so, whether the communication channel contains ADPCM elements. As described above, DIDc sequence 1206 may be employed to detect the presence of ADPCM because the present invention treats ADPCM as a digital impairment rather than as analog noise.

The preferred format of DIDc sequence 1206 employs a plurality of 8-bit PCM codewords, each having a sign bit (where, e.g., "zero" represents a positive sign and "one" represents a negative sign). Consequently, DIDc sequence 1206 is associated with a plurality of sign bits. The sign bits are encoded in accordance with a suitable scrambling algorithm, e.g., the call mode modem generating polynomial set forth in the ITU-T Recommendation V.34 (International Telecommunication Union, September 1994). This illustrative generating polynomial is $1+x^{-18}+x^{-23}$, and the scrambler (associated with transmitter 912) effectively divides the data sequence by the generating polynomial. As set forth in Recommendation V.34, the coefficients of the quotients of this division, taken in descending order, form the data sequence that appears at the output of the scrambler. The content of Recommendation V.34 is incorporated by reference herein.

In accordance with the illustrative embodiment, DIDc sequence 1206 is associated with a scrambler input having a pattern of a number of positive "ones" (e.g., a series of positive "ones") followed by alternating six consecutive "zeros" and six consecutive "ones". The number of codewords (and, consequently, the number of encoded sign bits) associated with DIDc sequence 1206 may vary for different practical applications. For example, the present embodiment may utilize between 4,000 and 6,000 codewords to ensure that DIDc sequence 1206 is transmitted during most or all of the ANSam signal. As mentioned above, after the sign bits are selected, the remaining seven bits associated with the DIDc codewords are chosen with the −48 dBm transmit power limit in mind. In a practical system, to properly maintain the signs associated with DIDc sequence 1206 in the presence of digital pads, a minimum PCM value of ±4 is employed for each of the DIDc codewords. Using the universal code representation, bit-two (where bit-zero is the least significant bit) of the remaining seven bits is selected as a "one" while bit-three through bit-six are all forced to "zero". In addition, bit-one and bit-zero of the DIDc codewords are encoded such that bit-one=$\overline{S}$ and such that bit-zero=S, where S indicates the scrambled sign bit for the given PCM codeword. This assignment of bit-one and bit-zero facilitates the determination of the digital characteristics of the current communication channel. Thus, the overall PCM (universal) format for the DIDc codewords follows the bit pattern S00001$\overline{S}$S. In an alternate equivalent embodiment, the DIDc codewords may follow the bit pattern S00001S$\overline{S}$.

In accordance with an alternate embodiment configured to simply detect whether the current channel is fully digital, the DIDc sequence 1206 may be configured such that the DIDc codewords follow the bit pattern S0001xx, where x indicates that bit-zero and bit-one are free to assume any value. Aside from the modification to the bit-zero and bit-one conditions, this alternate DIDc sequence 11206 is similar to the previous embodiment. It should be appreciated that the specific DIDc patterns described herein are not intended to limit the scope of the present invention in any way; any suitably formatted DIDc sequence 1206 may be utilized in the context of initialization process 1100.

With continued reference to FIG. 11, calling device 902 may perform a task 1110. Task 1110 initializes a symbol counter associated with calling device 902 in response to a characteristic of DIDc sequence 1206. In a practical embodiment, task 1110 may reset a modulo-6 counter maintained at calling device 902 (a modulo-6 counter contemplates the periodic effect of RBS in the digital at PSTN). Calling device 902 may prompt the modulo-6 counter in response to the DIDc sequence transition from the six "zeros" to the six "ones" associated with the scrambler input. For example, the modulo-6 count may initialize phase zero corresponding to the transition of binary one to binary zero (or vice versa). Consequently, task 1110 may be prompted during task 1108. Task 1110 may be performed to enable calling device 902 to eventually obtain timing synchronization with answer device 904 and to enable modem system 900 to properly detect and compensate for RBS.

As described above, answer device 904 conditions receiver 924 to obtain a received DIDc sequence associated with DIDc sequence 1206. In a practical system, DIDc sequence 1206 may be altered by any number of channel characteristics, e.g., digital pads, RBS, or other digital impairments. Accordingly, for purposes of this description, the DIDc sequence 1206 may not be the same as the received DIDc sequence. A query task 1112 may be performed to determine whether a received DIDc sequence is obtained by answer device 904. Even assuming that calling device 902 transmits DIDc sequence 1206, answer device 904 may not receive it (or answer device 904 may not be capable of receiving it).

If query task 1112 determines that answer device 904 did not detect a received DIDc sequence, then initialization process 1100 exits. As described above in connection with digital channel determination process 1000, process 1100 may exit into any number of conventional handshaking modes. For example, process 1100 may cause answer device 904 to proceed with the conventional V.8 initialization, e.g., to transmit the joint menu (JM) signal in response to a call menu (CM) signal transmitted by calling device 902. Answer device 904 may then continue in accordance with known V.34, V.90, or other initialization procedures.

If, however, query task 1112 determines that a received DIDc sequence was detected by answer device 904, then answer device preferably performs a query task 1114. Query task 1114 causes answer device 904 to analyze the received DIDc sequence to determine whether the downstream channel 908 is fully digital. In accordance with the example system described herein, query task 1114 causes answer device 904 to analyze the sign bits associated with the received DIDc sequence. Answer device 904, if compatible with initialization process 900, extracts the received sign bits and passes the sign bits through a suitable descrambler that applies the scrambling algorithm utilized by calling device 902, e.g., the V.34 call mode modem generating polynomial. If the descrambled sequence of sign bits is a pattern of all "ones" (or an alternating pattern of six "zeros" and six "ones"), then query task 1114 assumes that channel 908 is fully digital. Although not shown in FIG. 11, answer device 904 may initialize a symbol counter, e.g., a modulo-6 counter, in respone to the received DIDc sequence such that answer device 904 obtains timing synchronization with calling device 902. If query task 1114 determines that channel 908 is not fully digital, then initialization process 900 may exit into a conventional analog startup mode (as described above in connection with query task 1112). Furthermore, in response to a negative determination by query task 1114, answer device 904 may be prompted to transmit a conventional V.8JM signal to calling device 902.

In response to an affirmative determination by query task 1114, answer device 904 may perform a task 1116. Task 1116 causes answer device 904 to transmit a digital channel identification sequence (DIDa) to calling device 902. With brief reference to FIG. 12, this sequence is represented by DIDa sequence 1208. In the preferred embodiment, if answer device 904 is digitally connected to the network, then DIDa sequence 1208 is "automatically" generated following ANSam tone 1204.

In the preferred embodiment, DIDa sequence 1208 is constructed and formatted in substantially the same manner as DIDc sequence 1206. However, DIDa sequence 1208 is generated using a different scrambling algorithm for the sign bits. For example, answer device 904 may employ the answer mode modem generating polynomial set forth in the V.34 Recommendation. This illustrative generating polynomial is $1+x^{-5}+x^{-23}$, and the scrambler (associated with transmitter 922) effectively divides the data sequence by the generating polynomial. As mentioned above, the DIDa sequence 1208 may be alternately configured such that bit-zero and bit-one are free to assume any value (which may be desirable if initialization process 1100 is utilized to simply determine whether the current channel is fully digital).

Referring back to calling device 902, a task 1118 may be performed after the transmission of DIDc sequence 1206. During task 1118, calling device 902 transmits a call menu signal (represented by CM signal 1210 in FIG. 12) to answer device 904. In an exemplary practical embodiment, CM signal 1210 is formatted and transmitted in accordance with the V.8 Recommendation. CM signal 1210 may be transmitted such that modem system 900 remains compatible with legacy modes and to enable modem system 900 to fall back to conventional initialization modes if need be.

Task 1118 may also cause calling device 902 to suitably condition receiver 914 to obtain a received DIDa sequence associated with the DIDa sequence 1208 transmitted by answer device 904. A query task 1120 may be performed to determine whether a received DIDa sequence is obtained by calling device 902. Even assuming that answer device 904 transmits DIDa sequence 1208, answer device 904 may not receive it.

If query task 1120 determines that calling device 902 did not detect a received DIDa sequence, then initialization process 1100 exits. As described above in connection with query task 1112, process 1100 may exit into any number of conventional handshaking modes. For example, process 1100 may cause calling device 902 to proceed with the conventional V.8 initialization and to thereafter continue in accordance with known V.34, V.90, or other initialization procedures.

If, however, query task 1120 determines that a received DIDa sequence was detected by calling device 902, then calling device preferably performs a query task 1122. Like query task 1114, query task 1122 causes calling device 902 to analyze the received DIDa sequence to determine whether the upstream channel 910 is fully digital. In accordance with the example system described herein, query task 1122 causes calling device 902 to analyze the sign bits associated with the received DIDa sequence. If query task 1122 determines that channel 910 is not fully digital (by analysis of the DIDa sequence or by receiving a JM signal instead of a received DIDa sequence), then initialization process 900 may exit into a conventional analog startup mode.

Following task 1116 and query task 1122, modem system 900 may suitably enter a full digital mode 1124. The entering of the full digital mode 1124 may be responsive to an acknowledgment signal generated by calling device 902 and received by answer device 904. At this time, calling device 902 and answer device 904 have both determined that a fully digital communication channel has been established for the current connection.

Once a fully digital connection has been confirmed, modem system 900 may conduct a task 1126 to determine the type of digital connection. In other words, modem system 900 determines the digital characteristics of the channel during task 1126. Task 1126 may determine whether the communication channel contains digital impairments (e.g., RBS and/or digital pads), whether the channel includes a PCM encoding law conversion, and/or whether the channel is associated with an encoding compression technique such as ADPCM. During task 1126, calling device 902 continues to analyze the received DIDa sequence and answer device 904 continues to analyze the received DIDc sequence. In light of current data communication channel architectures, three different fully digital channel situations may be implicated where the sign bits in the DID sequences remain preserved after transmission: (1) a pure 64 kbps digital channel; (2) a digital PCM channel with RBS or digital pads; and (3) an ADPCM channel that may or may not contain concurrent digital impairments. The following description may be generally applied to calling device 902 or answer device 904.

To determine if the current digital connection is a clear 64 kbps channel, the relevant device compares the received DID pattern to the transmitted DID pattern. For the example system described herein, the receiving device suitably compares the received DID pattern to the bit pattern S00001$\overline{S}$S. If the sign bit pattern is not preserved, then the receiving device can assume that the channel is analog; the receiving device may fall back into a V.90 or V.34 initialization routine and use an appropriate line probing sequence. If the proper pattern is observed, then the channel is identified as a pure 64 kbps channel. Furthermore, a specific probing sequence that is related to the type of digital channel may follow (the system may have the option to proceed with a suitable line probing procedure even if a fully digital channel is identified). If the received pattern differs from the transmitted pattern, then the received DID sequence may be further analyzed to determine the cause of the error. Such further analysis may require the analyzing device to obtain timing synchronization with the sign bits of the received DID sequence. As described above, an appropriate symbol counting scheme may be initialized in response to a transition associated with the received DID sequence.

In accordance with the preferred embodiment, the sign bits and bit-one of the DID codewords are utilized for further analysis of the channel characteristics. For example, if bit-one equals $\overline{S}$ and bit-zero indicates RBS for at most five out of the six phases, then the channel is identified as containing only RBS. However, if all of the six phases are affected, then an impairment that affects all codewords may be implicated. As a result of this RBS identification, the RBS phases will also be known.

If bit-one equals $\overline{S}$ and bit-zero indicates RBS for all six phases, then the channel may include digital pads, encoding law conversions (e.g., mu-law to A-law or vice versa), and/or RBS for all six phases. If this situation arises, then the channel may first be identified as a non-ADPCM digital channel before proceeding with further analysis of the channel characteristics. In the context of initialization process 1100, such further analysis may be performed during a task 1130, described below.

If bit-1 does not equal $\overline{S}$, then it still may be possible that a non-ADPCM digital channel has been established. However, a further analysis may be required to confirm such a conclusion. Certain combinations of RBS and digital pads encountered in the channel will dictate particular relationships between the received symbols associated with the DID sequences. Accordingly, the receiving device is preferably configured to condition its receiver to observe RBS phase violations in the received DID sequence. If the receiving device does not detect a violation in the relationships between the received DID codewords, then modem system 900 can identify the current channel as a non-ADPCM digital channel. If, however, the receiving device detects a violation in the received DID codeword relationships, then modem system 900 can identify the current channel as an ADPCM impaired channel.

One suitable technique to detect such violations is to monitor one particular symbol phase of the received DID sequence. For example, although RBS has a typical period of six codewords, four robbed bits are used to convey signaling information by the network. Accordingly, if the same codeword is repeated, then, the receiving device will receive the same codeword based on a period of 24 codewords, assuming that the channel contains no ADPCM components. If the received symbols for the same phase are consistently observed, then the receiving device can assume that no ADPCM elements are present. In contrast, if the received symbols for the same phase are inconsistent over time, then the receiving device may safely assume that the received DID sequence has been affected by ADPCM.

Depending upon the digital channel type detected during task 1126, modem system 900 may enter any number of different connection modes that best suit the current channel impairments. For example, if task 1126 determines that a non-ADPCM channel has been established, then initialization process 1100 may proceed in accordance with a digital impairment learning (DIL) procedure to obtain the RBS and/or digital pad characteristics of the channel. V.90 modem systems employ such a DIL procedure in the context of the downstream channel. If a pure 64 kbps channel is detected, then initialization process 1100 may be abbreviated in a suitable manner. For purposes of this description, it is assumed that task 1126 detects the presence of an ADPCM element in the current channel.

Once the presence of ADPCM is identified by a receiving device, information regarding the discovery should be communicated to the other device. A task 1128 may be performed for this purpose. A number of different techniques may be utilized during task 1128. A first illustrative technique utilizes the INFO sequences that are normally associated with Phase 2 of conventional modem handshaking procedures. These sequences are represented by an INFO sequence 1212 and an INFO sequence 1214 in FIG. 12. In one practical embodiment, the receiving device (the device that initially discovered the ADPCM) communicates its discovery by setting or resetting an ADPCM indication bit associated with the respective INFO sequence. The ADPCM indication bit may be allocated specifically for this purpose. Upon receipt of the ADPCM indication bit, the calling device may then proceed in an appropriate manner.

A second illustrative technique for communicating the presence of ADPCM involves the use of orthogonal scrambling methods associated with the DID sequences. Such an alternate technique may be desirable when an ADPCM indication bit is not available in the Phase 2 INFO sequence. In accordance with the alternate technique, if answer device 904 identifies the current channel as an ADPCM channel, then it transmits a DIDa' sequence rather than DIDa sequence 1208. The sign bits associated with the DIDa' sequence are preferably scrambled in same manner described above. However, the input pattern of all positive "ones" is replaced by a pattern of "ones" and "zeros" produced by a different scheme. For example, the input pattern may be as simple as a periodic pattern of "1100" or as sophisticated as a scrambled sequence. Furthermore, the bit locations for both bit-one and bit-zero are swapped in comparison to DIDa sequence 1208. Thus, the identification data may be conveyed in the manner described above by encoding information in the sign bits associated with the DIDa' sequence.

As described above, calling device 902 analyzes the received DIDa' sequence to determine whether ADPCM is present in channel 910. If so, then calling device 902 may transmit a marker sequence 1216 (see FIG. 12) to inform answer device 904 of the discovery of ADPCM in the upstream channel 910. Marker sequence 1216 may be formatted like the other DID sequences, i.e., marker sequence 1216 may utilize a sequence of PCM codewords having encoded sign bits. Marker sequence 1216 may be a DIDc' sequence, where the input pattern is similar to the input pattern for the DIDa' and the input pattern is scrambled using the same methodology described above for DIDa sequence 1208. In FIG. 12, the marker sequence associated with the answer device may actually be realized by the DIDa' sequence or associated therewith. When answer device 904 has received confirmation from calling device 902 that an ADPCM channel has been detected, both devices may continue the initialization routine in a manner that contemplates the presence of ADPCM.

In addition to the ADPCM information exchange, the devices may also communicate other information regarding the characteristics of the channel. For example, modem system 900 may suitably exchange information related to whether the end devices are mu-law or A-law compliant, or whether the devices are associated with a PBX system. Information exchanged during this period may be useful to determine a preferred type of transmitter and/or receiver training.

Following task 1128, modem system 900 may proceed with a "Phase 3" handshake to enable the end devices to obtain additional information regarding the digital impairments. For example, a task 1130 may be performed to enable modem system 900 to: (1) identify the type of ADPCM algorithms utilized in the channel; (2) determine the compressed data rate associated with the ADPCM; and (3) determine if concurrent digital impairments such as digital pads and/or encoding law conversions exist. In the context of initialization process 900, task 1130 causes modem system 900 to perform a digital impairment (and ADPCM) learning procedure. As described above, task 1130 is optional in that it may be skipped or abbreviated depending upon the detected characteristics of the digital channel.

In the preferred embodiment, a single DIL sequence may be utilized to fully determine the digital impairment characteristics of the channel. For a practical system, the DIL sequence may include any number of components associated with different aspects of the DIL procedure. FIG. 12 shows a DIL/ADPCM sequence 1218 that may be transmitted by answer device 904 and a corresponding DIL/ADPCM sequence 1220 that may be transmitted by calling device 902.

During one phase of the DIL procedure, the different types of ADPCM codecs are identified. To date, there are three predominant types of ADPCM compression algorithms employed by telephone networks. Specifically, these ADPCM algorithms are: (1) ECI 32 kbps ADPCM, commonly utilized for trans-Atlantic calls; (2) OKI 32 kbps or 24 kbps ADPCM, commonly used for trans-Pacific calls; and (3) G.726 ADPCM, commonly used by PBX systems. The present invention is not limited to these specific encoding compression algorithms and the concepts described herein may be extended for use with any known algorithm or with algorithms that may be developed in the future. Furthermore, the present invention may employ a shortcut technique that only tests for the presence of a limited number of ADPCM algorithms, e.g., the most common algorithms.

Figure 13:
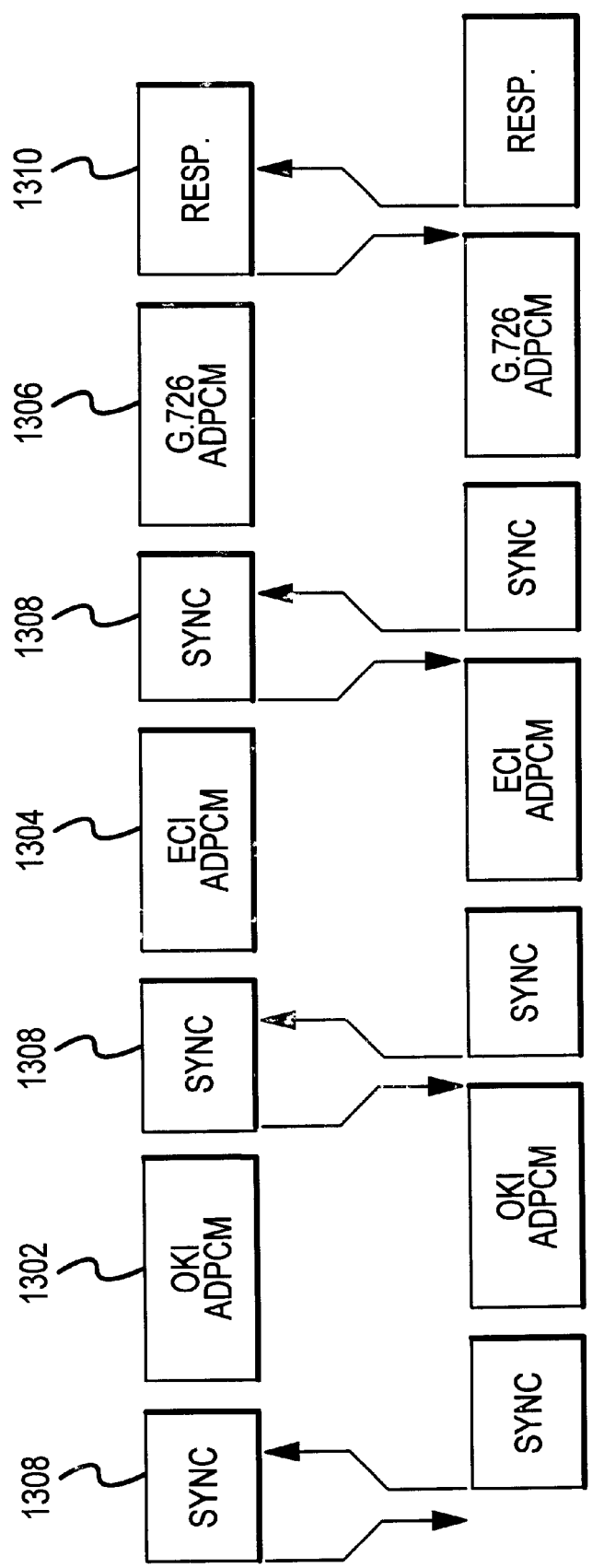
FIG. 13 is a schematic representation of digital impairment learning sequences that may be used during the modem initialization process.

To enable differentiation between these different compression algorithms, the preferred DIL sequence is a series of PCM codewords that are encoded using precoding schemes that are specific to each of the different algorithms. Thus, the ADPCM-encoded codewords are "immune" to additional applications of the associated ADPCM algorithm. If the ADPCM-encoded codewords are received unchanged, then the receiving device confirms that the particular ADPCM algorithm exists in the channel. FIG. 13 depicts specific portions associated with the OKI algorithm 1302, the ECI algorithm 1304, and the G.726 algorithm 1306. The different portions of the DIL sequence may be separated by respective synchronization sequences 1308. Since all of the known ADPCM methodologies enable modems to pass data at 8 kbps, the receiving device can identify its ADPCM codec selection using an appropriate response sequence 1310. Pending further study on these ADPCM compression algorithms, a universal precoding and decoding scheme may be developed that would enable the ADPCM codec determination procedure to be eliminated. In other words, it may not be necessary to differentiate among the different ADPCM algorithms if a universal precoding and decoding algorithm is developed.

Once the ADPCM encoding and decoding method has been determined, calling device 902 and answer device 904 may determine the compression data rate. For current ADPCM compression schemes, four possible modes are possible: (1) 5-bit compression at 40 kbps data rate; (2) 4-bit compression at 32 kbps data rate; (3) 3-bit compression at 24 kbps data rate; and (4) 2-bit compression at 16 kbps data rate. To determine the speed of the ADPCM channel, a pre-determined test sequence may be transmitted. Depending upon the characteristics of the received test sequence, the particular data rate can be determined.

As described briefly above, modem system 900 also determines the type of concurrent digital impairments (if any) during task 1130. In one practical embodiment, calling device 902 and answer device 904 transmit probing sequences that enable the respective receiving device to analyze the channel output. Based upon the observed channel output, the type and relative location of concurrent digital impairments (see FIGS. 3–8) can be determined and communicated back to the transmitting device. With respect to encoding law conversion, such impairments are already known by modem system 900. The specific location of an encoding law conversion is communicated during the information exchange procedure; the location is based on the specific channel model. Regarding digital pads, the probing sequences may include a series of DC steps (a DC step may be realized by repeating the transmission of the same codeword) to determine the mapping. The transmission of DC steps makes the ADPCM components effectively transparent. The specific location of the digital pad elements is obtained during the information exchange procedure based on the channel model. RBS has little or no effect on ADPCM channels because RBS only affects the least significant bit of the codewords while ADPCM compression may affect the codewords in a substantial manner. In other words, the effect of RBS will be lost in the ADPCM compression. Accordingly, task 1130 need not analyze the channel for RBS.

After the various digital impairments (including ADPCM, which is treated like a digital impairment) are determined, a task 1132 may be performed to suitably condition modem system to compensate for one or more of the digital impairments. For example, task 1132 may cause calling device 902 and/or answer device 904 to implement preceding and decoding operations to compensate for the ADPCM encoding compression technique. In a practical embodiment, such compensation may be realized by a digital mapping scheme associated with symbols transmitted over the digital channel. In this manner, task 1132 preferably conditions calling device 902 and/or answer device 904 such that the ADPCM compression is treated as a digital impairment. In addition, compensation for encoding law conversions and/or digital pads may be performed by either end device, depending upon the location of the respective impairments.

For the ADPCM channel described herein, a typical data transmission routine (task 1134) may be associated with the following elements. First, the transmit symbol constellations may be based on the allowable ADPCM codewords associated with the particular compression algorithm. For example, for a 32 kbps ADPCM channel, the possible PCM codewords are 1 to 15. The transmit modem may utilize "source coding" algorithms that remove certain transitions between different constellation points to ensure non-violation of the ADPCM encoding and decoding integrity. In addition, the transmitter in the transmit modem may be conditioned to employ precoding routines to encode n-bit (n=2, 3, 4, 5) "source coded" sequences into sequences of 8-bit PCM symbols. For example, an n-bit ADPCM decoder may be utilized in this context. The transmitter in the transmit modem may utilize a pre-compensation scheme for concurrent digital impairments, e.g., digital pads or encoding law conversions, that occur before the ADPCM elements.

The receiver in the receiving modem may utilize compensation for concurrent digital impairments that occur after the ADPCM elements. The receiver in the receiving modem may also implement a decoding routine to suitably decode the received PCM symbols into an n-bit "source coded" sequence. Finally, the receiver may employ inverse "source coding" algorithms to obtain the transmitted n-bit data sequence. In this manner, modem system 900 is capable of obtaining accurate channel compensation during the data mode associated with task 1134.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A method for initializing a data transmission system having a calling device configured to communicate with an answer device via a digital communication network, said method comprising the steps of:

establishing a communication channel between said calling device and said answer device;

obtaining a received digital channel identification (DIDc) sequence at said answer device, wherein said received DIDc sequence is associated with a DIDc sequence transmitted by said calling device over said communication channel;

analyzing said received DIDc sequence to determine whether said communication channel is a fully digital channel; and entering a full digital mode if said analyzing step determines that said communication channel is fully digital;

wherein said DIDc sequence comprises a plurality of pulse code modulation (PCM) codewords, and wherein each of said plurality of PCM codewords is an eight-bit codeword comprising a sign bit such that said DIDc sequence is associated with a plurality of sign bits, said plurality of sign bits are encoded in accordance with a scrambling algorithm, and each of said plurality of PCM codewords is formatted in accordance with a bit pattern S00001$\overline{S}$S, wherein S indicates a scrambled sign bit for each of said plurality of PCM codewords.

2. A method according to claim 1, wherein said obtaining step is performed while said answer device is transmitting an analog answer tone.

3. A method according to claim 1, wherein said DIDc sequence is configured such that its equivalent transmit power level is less than −48 dBm.

4. A method according to claim 1, further comprising the step of entering an analog mode if said analyzing step determines that said communication channel is not fully digital.

5. A method according to claim 1, wherein said analyzing step further determines whether said communication channel contains digital impairments.

6. A method according to claim 5, further comprising the step of performing a digital impairment learning procedure if said analyzing step determines that said communication channel contains certain types of digital impairments.

7. A method according to claim 1, wherein said analyzing step further determines whether said communication channel is associated with an encoding compression technique, said encoding compression technique being modeled as a digital impairment.

8. A method according to claim 1, further comprising the step of transmitting a second digital channel identification sequence (DIDa) from said answer device to said calling device, said transmitting step being performed if said analyzing step determines that said communication channel is fully digital.

9. A method according to claim 8, wherein:

said DIDa sequence comprises a plurality of PCM codewords;

each of said plurality of PCM codewords of said DIDa sequence is an eight-bit codeword comprising a sign bit such that said DIDa sequence is associated with a plurality of sign bits;

said plurality of sign bits of said DIDa sequence are encoded in accordance with said scrambling algorithm; and each of said plurality of PCM codewords of said DIDa sequence is formatted in accordance with the bit pattern S00001$\overline{S}$S.

10. A method for initializing a data transmission system having a calling device configured to communicate with an answer device via a digital communication network, said method comprising the steps of:

establishing a communication channel between said calling device and said answer device;

transmitting a digital channel identification (DIDc) sequence from said calling device to said answer device, said DIDc sequence being configured to enable said answer device to determine characteristics of said communication channel;

obtaining a received digital channel identification (DIDa) sequence at said calling device, wherein said received DIDa sequence is associated with a DIDa sequence transmitted by said answer device over said communication channel, said DIDa sequence being transmitted by said answer device if said answer device determines that said communication channel is fully digital; and entering a full digital mode in response to said DIDa sequence;

wherein said DIDc sequence comprises a plurality of pulse code modulation (PCM) codewords, and wherein each of said plurality of PCM codewords is an eight-bit codeword comprising a sign bit such that said DIDc sequence is associated with a plurality of sign bits, said plurality of sign bits are encoded in accordance with a scrambling algorithm, and each of said plurality of PCM codewords is formatted in accordance with a bit pattern S00001$\overline{S}$S, wherein S indicates a scrambled sign bit for each of said plurality of PCM codewords.

11. A method according to claim 10, wherein said transmitting step is performed while said answer device is transmitting an analog answer tone.

12. A method according to claim 10, wherein said DIDc sequence is configured such that its equivalent transmit power level is less than −48 dBm.

13. A method according to claim 10, further comprising the step of initializing a symbol counter associated with said calling device in response to a characteristic of said DIDc sequence.

14. A method according to claim 1 further comprising the steps of:
   identifying whether said communication channel is associated with an encoding compression technique;
   determining an encoding algorithm employed by said encoding compression technique; and
   compensating for said encoding compression technique.

15. A method according to claim 14, wherein said encoding compression technique is an adaptive differential pulse code modulation (ADPCM) technique.

16. A method according to claim 15, wherein said determining step determines a compression data rate employed by said ADPCM technique.

17. A method according to claim 14, wherein said compensating implements precoding and decoding operations to compensate for said encoding compression technique.

18. A method according to claim 14, wherein said encoding compression technique is a differential pulse code modulation (DPCM) technique.

19. A method according to claim 14, wherein said step of compensating compensates for said encoding compression technique by treating said encoding compression technique as a digital impairment.

20. A method according to claim 14, wherein said step of compensating compensates for said encoding compression technique by utilizing a digital mapping scheme associated with symbols transmitted over said communication channel.

21. A device comprising:
   a call establishment module configured to establish a communication channel with a remote communication device;
   a receiver configured to obtain a received digital channel identification (DIDc) sequence from said remote communication device over said communication channel; and
   a processor configured to analyze said received DIDc sequence to determine whether said communication channel is a fully digital channel;
   wherein said device enters a full digital mode if said processor determines that said communication channel is fully digital, and wherein said DIDc sequence comprises a plurality of pulse code modulation (PCM) codewords, and wherein each of said plurality of PCM codewords is an eight-bit codeword comprising a sign bit such that said DIDc sequence is associated with a plurality of sign bits, said plurality of sign bits are encoded in accordance with a scrambling algorithm, and each of said plurality of PCM codewords is formatted in accordance with a bit pattern S00001$\overline{S}$S, wherein S indicates a scrambled sign bit for each of said plurality of PCM codewords.

22. A device according to claim 21, further comprising a transmitter, wherein said receiver receives said DIDc sequence while said transmitter transmits an answer tone.

23. A device according to claim 21, wherein said DIDc sequence is configured such that its equivalent transmit power level is less than −48 dBm.

24. A device according to claim 21, wherein said processor identifies that said communication channel is associated with an encoding compression technique, determines an encoding algorithm employed by said encoding compression technique, and compensates for said encoding compression technique.

25. A device according to claim 24, wherein said encoding compression technique is an adaptive differential pulse code modulation (ADPCM) technique.

26. A device according to claim 25, wherein said processor determines a compression data rate employed by said ADPCM technique.

27. A device according to claim 24, wherein said processor performs preceding and decoding operations to compensate for said encoding compression technique.

28. A device according to claim 24, wherein said encoding compression technique is a differential pulse code modulation (DPCM) technique.

29. A device according to claim 24, wherein said processor compensates for said encoding compression technique by treating said encoding compression technique as a digital impairment.

30. A device according to claim 24, wherein said processor compensates for said encoding compression technique by utilizing a digital mapping scheme associated with symbols transmitted over said communication channel.

31. A device comprising:
   a call establishment module configured to establish a communication channel with a remote communication device;
   a transmitter configured to transmit a digital channel identification (DIDc) sequence to said remote communication device, said DIDc sequence being configured to enable said remote communication device to determine characteristics of said communication channel;
   a receiver configured to obtain a received digital channel identification (DIDa) sequence from said remote communication device in response to said DIDc sequence; and
   wherein said device enters a full digital mode in response to said DIDa sequence, and wherein said DIDc sequence comprises a plurality of pulse code modulation (PCM) codewords, and wherein each of said plurality of PCM codewords is an eight-bit codeword comprising a sign bit such that said DIDc sequence is associated with a plurality of sign bits, said plurality of sign bits are encoded in accordance with a scrambling algorithm, and each of said plurality of PCM codewords is formatted in accordance with a bit pattern S00001$\overline{S}$S, wherein S indicates a scrambled sign bit for each of said plurality of PCM codewords.

32. A device according to claim 31, wherein said receiver receives an answer tone while said transmitter transmits said DIDc sequence.

33. A device according to claim 31, wherein said DIDc sequence is configured such that its equivalent transmit power level is less than −48 dBm.

34. A device according to claim 31, comprising a processor, wherein said processor identifies that said communication channel is associated with an encoding compression technique, determines an encoding algorithm employed by said encoding compression technique, and compensates for said encoding compression technique.

35. A device according to claim 34, wherein said encoding compression technique is an adaptive differential pulse code modulation (ADPCM) technique.

36. A device according to claim 35, wherein said processor determines a compression data rate employed by said ADPCM technique.

37. A device according to claim 34, wherein said processor performs preceding and decoding operations to compensate for said encoding compression technique.

38. A device according to claim 34, wherein said encoding compression technique is a differential pulse code modulation (DPCM) technique.

39. A device according to claim 34, wherein said processor compensates for said encoding compression technique by treating said encoding compression technique as a digital impairment.

40. A device according to claim 34, wherein said processor compensates for said encoding compression technique by utilizing a digital mapping scheme associated with symbols transmitted over said communication channel.

* * * * *